United States Patent [19]

Nakayama et al.

[11] Patent Number: 5,902,709
[45] Date of Patent: May 11, 1999

[54] POLYESTER RESIN FOR ELECTROPHOTOGRAPHY TONER, PROCESS FOR PREPARING THE SAME, AND AN ELECTROPHOTOGRAPHIC TONER COMPRISING THE SAME

[75] Inventors: Koji Nakayama; Haruo Okutani, both of Shizuoka, Japan

[73] Assignee: Tomoegawa Paper Co., Ltd., Tokyo, Japan

[21] Appl. No.: 08/842,423

[22] Filed: Apr. 24, 1997

[30]     Foreign Application Priority Data

Apr. 26, 1996  [JP]  Japan ................................. 8-130690
Aug. 22, 1996  [JP]  Japan ................................. 8-238690

[51] Int. Cl.$^6$ .......................... C08G 63/20; C08G 63/91; G03G 9/08
[52] U.S. Cl. .......................... 430/109; 525/444; 528/296; 528/302
[58] Field of Search ............................ 525/444; 528/296, 528/302; 430/109

[56]                References Cited

U.S. PATENT DOCUMENTS 3,681,106  8/1972  Burns ...................................... 430/109
5,618,648  4/1997  Horikoshi ................................ 430/109

*Primary Examiner*—Patricia A. Short
*Attorney, Agent, or Firm*—Oblon, Spivak, McClelland, Maier & Neustadt, P.C.

[57]              ABSTRACT

A polyester resin for a toner wherein a ratio of insoluble material in THF is comprised at 5 weight % or less, a ratio of soluble polymer having a molecular weight of $1 \times 10^6$ or greater in THF is comprised at a range of 1 weight % to 10 weight %, a soluble polymer having a molecular weight greater than $1 \times 10^5$ in THF is comprised in a range of 10 weight % to 20 weight %, and the following relationship is satisfied W1>W2 wherein a ratio of a soluble polymer having a molecular weight less than $1 \times 10^4$ in THF is shown by W1, a ratio of a soluble polymer having a molecular weight greater than $1 \times 10^4$ and less than $1 \times 10^5$ in THF is shown by W2.

15 Claims, No Drawings

POLYESTER RESIN FOR ELECTROPHOTOGRAPHY TONER, PROCESS FOR PREPARING THE SAME, AND AN ELECTROPHOTOGRAPHIC TONER COMPRISING THE SAME

BACKGROUND OF THE INVENTION

1. Field of the Invention

The present invention relates to a toner for electrophotography which is used in printers or coelectrophotography machines utilizing heat-roll fixing. Moreover, the present invention relates to a polyester resin used in the toner for electrophotography, and to a process for preparing the same.

2. Description of the Related Art

Recently, various improvements or modifications on coelectrophotography machines or printers utilizing electrophotography have been desired as these machines have become more popular. For example, it has been desired to reduce energy consumption in order for these machines to be practical for home use. It is also desirable to make the machines run at high speeds in order to promote the spread of the machines into so called gray areas between printers and copiers. It is also necessary to simpler the structure of the machine in order to reduce the cost of the machines. Moreover, it has become popular to use the machines having functions of printing on both sides of the printed sheet and delivering the printed sheet automatically. Of the above-described requirements, particularly desired is a toner for electrophotography (hereafter, referred to simply as "toner") having a lower fixing temperature, a good anti-offset quality and Kin strength so that spots are not generated in a printed sheet in printing both sides of the printed sheet.

In order to achieve the requirements in the past, the following were suggested, such as improving a molecular weight and a molecular weight distribution of a binder resin.

Specifically in order to give a good low temperature fixing property to the toner, it is preferable to use the binder resin having a lower molecular weight. By using a resin having a lower molecular weight as a binder resin such as styrene-acrylic resin, the fixing property at low temperatures can be improved; however, the toner comprising styrene-acrylic resin is fragile, and the toner is easily crushed by a stress in a developing machine. As a result, a distribution of a particle size of a toner is changed, or a crushed toner easily coagulated to a carrier particle or a developing sleeve; and when the toner is used for a copying over a long period, the image quality unavoidably deteriorated by changing a charging property. Moreover, a spot is generated in printing on both sides of the printed sheet and delivering the printed sheet automatically.

On the other hand, when the molecular weight of a polyester resin was to be lower, the melting point thereof became lower, simultaneously the viscosity thereof became lower, therefore, an offset phenomena to a fixing roller was generated. In order to prevent generating the offset phenomena, it was suggested to introduce a crossing structure to polyester resin for widening the molecular distribution of polyester resin. The molecular weight distribution can be widen by introducing a crosslinking structure, therefore, the generation of the offset phenomena can be prevented. However, the total molecular weight range of polyester resin also became wider, therefore, the fixing properties of the toner comprising such polyester resin became worse. Consequently, in order to give sufficient fixing properties to the toner, it was necessary to lower a glass transition temperature (Tg) of the resin. Therefore, it is difficult to avoid deteriorating the storage properties of the toner comprising the resin. In this way, it is difficult to provide a toner having anti-offset properties, satisfactory storage properties, and low temperature fixing properties.

SUMMARY OF THE INVENTION

Therefore, it is an object of the present invention is to provide a toner, wherein a ratio of insoluble material in THF is comprised at 5 weight % or less, a ratio of soluble polymer having a molecular weight of $1\times10^6$ or greater in THF is comprised at a range of 1 weight % to 10 weight %, a soluble polymer having a molecular weight greater than $1\times10^5$ in THF is comprised in a range of 10 weight % to 20 weight %, and the following relationship is satisfied $W1 > W2$ wherein a ratio of a soluble polymer having a molecular weight less than $1\times10^4$ in THF is shown by W1, a ratio of a soluble polymer having a molecular weight greater than $1\times10^4$ and less than $1\times10^5$ in THF is shown by W2.

The present invention provides a process for preparing the polyester resin for a toner, comprising the steps of melting with heat a linear polyester resin having a molecular weight peak top in a range of $1\times10^3$ to $1\times10^4$, and the total amount of an acid value and hydroxyl group value being equal to 100 KOH mg/g or less; and polycondensating with at least one component selected from the group consisting of polycarboxylic acid component having more than 3 carboxyl groups and polyol having more than 3 hydroxyl groups, and at least one component selected from the group consisting of diol component and dicarboxylic acid component.

The present invention also provides another process for preparing the polyester resin for a toner, comprising the steps of synthesizing a linear polyester resin having a molecular weight peak top in a range of $1\times10^3$ to $1\times10^4$, and the total amount of an acid value and hydroxyl group value being equal to 100 KOH mg/g or less; polycondensating with at least one component selected from the group consisting of polycarboxylic acid component having more than 3 carboxyl groups and polyol having more than 3 hydroxyl groups, and at least one component selected from the group consisting of diol component and dicarboxylic acid component; and stopping the polycondensation reaction when the stirring torque became 2 to 5 times, the stirring torque immediately after adding the at least one component selected from the group consisting of polycarboxylic acid component having more than 3 carboxyl groups and polyol having more than 3 hydroxyl groups, and at least one component selected from the group consisting of diol component and dicarboxylic acid component.

Moreover, the present invention also provides a toner comprising the same.

DESCRIPTION OF THE PREFERRED EMBODIMENTS

In the following, preferred embodiments of the polyester resin used to make the toner, a toner comprising the same, and a process for preparing polyester resin will be presented.

Polyester resin for a toner of the present invention is a branched polyester resin which ultimately does not generate a gel composition (a insoluble component in THF ) by crosslinking, and which is obtained by mixing at least one crosslinking component selected from the group consisting of polycarboxylic acid component having more than 3 carboxyl groups and polyol having more than 3 hydroxyl groups.

Namely, polyester resin of the present invention is characterized in that the ratio of insoluble component in tetrahydrofuran (abbreviated to "TEF" hereinbelow) is comprised. When the ratio of the insoluble component in THF is comprised at 5 weight % or greater, the viscosity of the toner comprised thereof is too high, therefore, the low temperature fixing properties becomes worse. It is most preferable for low temperature fixing properties of the toner that the insoluble component in THF is not contained that is, the insoluble component in THF is contained in the polyester resin at 0 weight %.

Moreover, in the present specification, "the insoluble component" means the component obtained by putting 0.5 g of the resin into 50 ml of THF, dissolving with heat at 60° C. for 3 hours, filtering the obtained insoluble resin composition with a filter (Marketed by CELITE Co., Ltd., Trade name: Celight #545), and drying at 80° C. in a vacuum. The weight % of the insoluble component can be calculated by the formula: (Wd / 0.5)×100, wherein Wd means the weight (g) of the dried insoluble component.

The soluble component in THF has a molecular weight of $1\times10^6$ or greater at a range of 1 weight % to 10 weight %. The molecular weight is measured by Gel Permeation Chromatography (abbreviated to "GPC" hereinbelow). When the weight ratio is less than 1 weight %, in fixing with a heat roller, a high temperature offset phenomena is generated. When the weight ratio is larger than 10 weigh %, the melting viscosity of the toner comprised thereof is too high; therefore, a low temperature fixing strength becomes lower.

The soluble polymer having a molecular weight greater than $1\times10^5$ in THF is comprised in a range of 10 weight % to 20 weight %. When the weight ratio is less than 10 weight %, a high temperature offset phenomena is generated. When the weight ratio is larger than 20 weigh %, the melting viscosity of the toner comprise thereof is too high, therefore, a low temperature fixing strength becomes lower.

Moreover, the soluble component in THF satisfy the following relationship: W1>W2, wherein a ratio of a polymer having a molecular weight less than $1\times10^4$ is shown by W1, a ratio of a polymer having a molecular weight more than $1\times10^4$ less and than $1\times10^5$ is shown by W2. When W1≦W2, the melt string temperature is high; therefore, the low temperature fixing properties of the toner becomes worse.

The ratio of a soluble polymer having a molecular weight less than $1\times10^4$ in THF is larger, the toner comprising the low molecular compound can have good low temperature fixing properties. However, the ratio of the soluble polymer having a molecular weight greater than $1\times10^4$ and less than $1\times10^5$ in THF is extremely low, and the strength of the resin is low. Moreover, the toner comprised thereof can be easily crushed in a developer. When the crushing of the toners is increased, the life of the developer becomes short. The crushed toners melt on a photosensitive member or a developing sleeve, and the life period of the developing device becomes short. Therefore, in particular, W1/W2 in a range of 1.3 to 3.5 is preferable. When W1/W2 is less than 1.3, it is difficult to obtain a sufficient low temperature fixing strength. In contrast, when W1/W2 is more than 3.5, the high temperature offset phenomena are easily generated; therefore, the life of the developer is short. In order to obtain best the low temperature fixing properties, W1/W2 should be in a range of 1.9 to 3.5.

When the peak top molecular weight is in the lower molecular range, the low temperature fixing properties becomes better. However, when the peak top molecular weight is in the exceed lower molecular range, the strength of the prepared resin is weak, therefore, the life of the developer becomes short. Therefore, the peak top molecular weight of the polyester resin of the present invention is preferably in the range of $1\times10^3$ to $1\times10^4$, more preferably in the range of $3\times10^3$ to $6\times10^4$. When the peak top molecular weight is less than $1\times10^3$, the strength of the prepared resin is weak, therefore, the life of the developer becomes short. When the peak top molecular weight is more than $1\times10^4$, the melt initiation temperature is high, therefore, the low temperature fixing properties becomes worse.

Moreover, the acid value of the polyester resin of the present invention preferably equals 5 KOH mg/g or less. When the acid value is greater than 5 KOH mg/g, the anti-moisture properties of the polyester resin becomes worse, therefore the storage stability of the toner comprising the same becomes worse.

In the present specification, the molecular distribution is measured by preparing the above-mentioned 50 ml of THF solution used for obtaining the insoluble component in THF, and obtaining the molecular distribution of the solution by the following steps. The ratio of the molecular weight is calculated from integrated values in each molecular weight range, which are obtained from the results of chromatogram.

GPC is measured by injecting 8 mg of sample (concentration:0.4 gr./dl, temperature: 25° C., solvent: tetrahydrofuran) into a flowing solvent (tetrahydrofuran) with a current speed of 1 ml /min. The measurement conditions are selected so as the molecular weight distribution of the samples is in a straight calibration curve between logarithms of standard molecular weights of monodisperse polyethylene standard samples and count values. Confidences of measurements are confirmed that Mw/Mn of the polystyrene standard sample (sample: NBS 706; Mw: $28.8\times10^4$; Mn: $13.7\times10^4$; Mw/Mn: 2.11) is equal 2.11±0.10 at these conditions.

The preferred embodiments of process for preparing a polyester resin used to make the toner will be explained below.

The polyester resin for a toner of the present invention can be prepared in a first preparing method of the present invention by melting with heat a linear polyester resin having a molecular weight peak top in a range of $1\times10^3$ to $1\times10^4$, and the total amount of an acid value and hydroxyl group value being equal 100 KOH mg/g or less; and polycondensating with at least one component selected from the group consisting of polycarboxylic acid component having more than 3 carboxyl groups and polyol having more than 3 hydroxyl groups, and at least one component selected from the group consisting of diol component and dicarboxylic acid component.

Namely, after the linear polyester resin is prepared, the polyester resin of the present invention can be prepared by cooling the prepared linear polyester; heading and melting again adding at least one component selected from the group consisting of polycarhoxyeic acid component having more than 3 carboxyl groups and polyol having more than 3 hydroxyl groups, and at least one component selected from the group consisting of diol component and dicarboxylic acid component to the melting linear polyester resin; and polycondensing the mixture.

The polyester resin of the present invention can be prepared in a second preparing method of the present invention by synthesizing a linear polyester resin having a molecular weight peak top in a range of $1\times10^3$ to $1\times10^4$, and the total amount of an acid value and hydroxyl group value being equal to 100 KOH mg/g or less; polycondensating with at least one component selected from the group consisting of polycarboxylic acid component having more man 3 carboxyl groups and polyol having more than 3 hydroxyl groups, and at least one component selected from the group consisting of diol component and dicarboxylic acid component; and stopping the polycondensation reaction when the stirring torque became 2 to 5 times, preferable 3 to 5 times the stirring torque immediately after adding the at least one component selected from the group consisting of polycarboxylic acid component having more than 3 carboxyl groups and polyol having more than 3 hydroxyl groups, and at least one component selected from the group consisting of diol component and dicarboxylic acid component.

Namely, after the linear polyester resin is prepared, without cooling the prepared linear polyester resin, polyester resin of the present invention can be prepared by adding at least one component selected form the group consisting of polycarboxylic acid component having more than 3 carboxyl groups and polyol having more than 3 hydroxyl groups, and at least one component selected from the group consisting of diol component and dicarboxylic acid component to the prepared linear polyester resin; and polycondensing the mixture.

Exactly, at first, the linear polyester resin having a molecular weight peak top in a range of $1 \times 10^3$ to $1 \times 10^4$, and the amount of the acid value and the hydroxyl group value in a range of 100 KOH mg/g or less is synthesized in a first polycondensation reaction, by using a monomer comprised of the diol component and dicarboxylic acid component. The linear polyester resin can be obtained by controlling the mole ratio of diol component and dicaroxylic acid component (diol component/dicarboxylic acid component) in a range of 0.8 to 1.2, and stopping the reaction when the reacted solution becomes transparent.

In this reaction, the molecular weight peak top is less than $1 \times 10^3$, the glass transition temperature thereof is lower, and the glass transition temperature of the obtained crosslinked resin after the reaction is too low, therefore the storage properties becomes worse. In contrast, the molecular weight peak top is more than $1 \times 10^4$, the glass transition temperature of the obtained crosslinked resin in after reaction is too low, the molecular weight of the obtained crosslinked resin after the reaction is too large, and the relationship W1>W2 can be satisfied. For example, it may occur that the ratio of the insoluble component in THF having molecular weight of $1 \times 10^6$ or greater is beyond 10 weight %, or the ratio of the insoluble component in THF having molecular weight of $1 \times 10^5$ or greater is beyond 20 weight %. As a result, the relationship W1>W2 cannot be satisfied, the melt initiation temperature of the toner comprised the obtained polyester resin is above 105° C.; therefore, the toner cannot melt so as to melt by a fixing roller, and the low temperature fixing properties becomes worse.

It is necessary for the linear polyester resin that the total amount of an acid value and hydroxyl group value be equal to 100 KOH mg/g or less. When the total amount of an acid value and hydroxyl group value is equal to 100 KOH mg/g or greater, that is, the functional group of the linear polyester resin is in large quantities, the molecular weight of polyester resin of the present invention which is obtained in after steps is larger; therefore, a large amount of the insoluble component in THF is prepared, the melting viscosity thereof is becomes high, and the low temperature fixing properties becomes worse.

Therefore, in order to prevent the molecular weight of the polyester resin of the present invention from being large, to keep the melting initiation temperature being below, and to keep the low temperature fixing properties being good, it is preferable that the tot amount of an acid value and hydroxyl group value be equal to 100 KOH mg/g or less, and more preferable to 60 KOH mg/g or less.

In the present specification, the acid value and the hydroxyl group value means the values measured in accordance with Japanese Industrial Standard K 0070.

The acid value and the hydroxyl group values are defined as the values measured by the following method.

(Acid value: based upon Japanese Industrial Standard K0070)
1. Use reagent
   solvent: tetrahydrofuran (THF)
   indicator: phenolphtalein (0.1 % ethanol solution)
   titrant: 1/100N potassium methoxide solution (benzen: methanol=9:1)
2. Use instruments
   100 ml triangular flask
   graduated glass
   stirrer
   stirrer tip
   buret
3. Measuring steps
   1. 0.5 g of sample was measured and put into the 100 ml triangular flask.
   2. 100 ml of THF was added, and a stirrer tip was put into the flask, and began to stirring.
   3. Indicator ( phenolphtalein) was added, titrating the sample with 1/100N potassium methoxide solution with stirring by the stirrer.

(Hydrol group value: based upon Japanese Industrial Standard K0070)
1. Use reagent
   solvent: tetrahydrofuran (THF)
   acetylated indicator: acetic anhydride (0.5 g) pyridine (100 ml)
   indicator: phenolphtalein (0.1 % ethanol solution)
   titrant: 1/100N potassium methoxide solution (benzen: methanol=9:1)
2. Use instruments
   100 ml triangular flask
   100 ml measuring flask
   graduated glass
   stirrer
   stirrer tip
   buret
3. Measuring steps
   1. 0.02 g of sample was measured and put into the 100 ml triangular flask.
   2. Acetylated solution was made. 0.5 g of acetic anhydride was added to the 100 ml measuring flask, and the 100 ml measuring flask was made full with pyridine.
   3. 5 ml of the obtained acetylated solution was added, and the solution comprising the sample was prepared.
   4. Acetylation is performed in a warm silicone bath for 1 hour, then cooled, and 1 ml of water was added from the upper part of the cooling tube.
   5. Further heating for 10 minutes, then cooling, 5 ml of THF was added. In this time, THF was added in the triangular flask so as to run down (rinse) the inside wall of the flask.
   6. Indicator (phenolphtalein) was added, titrating the sample with 1/100N potassium methoxide solution with stirring by the stirrer.

7. In the case of the blank test, the above steps were performed without adding sample.

The diol components and dicarboxylic acid component which are used for syntheses of the linear polyester resin, for instance, are as follows.

The diol components are, for example, polyoxyethylene bisphenol A, polyoxypropyrene bisphenol A, polyoxyethylene bisphenol, polyoxypropyrene bisphenol, diethanol amine, ethylene glycol, diethylene glycol, polyethylene glycol, propylene glycol isopylene glycol, octane diol, 2,2-diethyl-1,3-propane diol, spiro glycol, neopenthyl glycol, 1,3-butanediol, 1,4butane diol, 2-butyl-2-ethyl-1,3-propane diol, 1,6-hexane diol, hexylene glycol 1,5-pentane diol 3-methyl-1,5-pentane diol hydrobenzoin, bis($-hydroxyethyl) terphtalate, bis(hydroxybutylierephtalate, and the like.

The dicarboxylic acid components are, for example, fumaric acid, maleic acid, phthalic acid, isophthalic acid, itaconic acid, mesaconic acid, citraconic acid,,glutaconic acid, terephthalic acid, cyclohexane dicarboxylic acid, cyclohexene dicarboxylic acid, sebasic acid, eicosanoic diacid, azelaic acid, brasilic acid, succilic acid, adipic acid, dodecanoic diacid, 1,12-dodecanoic dicarboxylic acid, naphthalene dicarboxylic acid, biphenyl-4,4-icarboxylic acid, 2,3-piperazine-dicarboxylic acid, imino dicarboxylic acid, imidazol-4,5-dicarboxylic acid, piperizine dicarboxylic acid, N-phenylpyrazol dicarboxylic acid, pyridine dicarboxylic acid, carbazole-3,6-dicarboxylic acid, 9-methylcarbazole3,6-dicarboxylic acid, carbszole-3,6-diketobutyric acid, carbazole-3,6-r, r'-diketobutric acid, 4-hydroxyisophthalic acid, 2,5-dihydroxy-l,4benzen diacetic acid, chelidomic acid, bis(2-hydroxy-3-carboxyphenyl) methane, methane, anhydrides thereof low alkyl esters thereon and the like.

Next, in the first preparing method of the present invention, the polyester resin of the present invention is prepared by melting with heat 80 to 95 weight parts of the linear polyester resin obtained in the above-mentioned first step in a range of 180 to 230° C.; mixing 5 to 20 weight parts of at least one component selected from the group consisting of polycarboxylic acid component having more than 3 carboxyl groups and polyol having more than 3 hydroxyl groups, and at least one component selected from the group consisting of diol component and dicarboxylic acid component; performing the second polycondensation reaction. When at least one component selected from the group consisting of polycarboxylic acid component having more than 3 carboxyl groups and polyol having more than 3 hydroxyl groups is less than 5 weight parts, the molecular weight distribution cannot increase sufficiently, therefore the offset phenomena at high temperature occurs. In contrast, when the weight parts is greater than 20 weight parts, the molecular weight of the polyester resin increases, the viscosity increase, therefore, the fixing properties at low temperature becomes worse.

In the second preparing method of the present invention, after the first reaction is finished, after felling the temperature the prepared linear polyester resin, polycondensating the linear polyester resin with at least one component selected from the group consisting of polycarboxylic acid component having more than 3 carboxyl groups and polyol having more than 3 hydroxyl groups, and at least one component selected from the group consisting of diol component and dicarboxylic acid component; and stopping the polycondensation reaction when the stirring torque became 2 to 5 times, preferable 3 to 5 times the stirring torque immediately after adding the at least one component selected from the group consisting of polycarboxylic acid component having more than 3 carboxyl groups and polyol having more than 3 hydroxyl groups, and at least one component selected from the group consisting of diol component and dicarboxylic acid component.

In this case, the amount of the at least one component selected from the group consisting of polycarboxylic acid component having more than 3 carboxyl groups and polyol having more than 3 hydroxyl groups is in a range of 2.5 mol % to 10 mol % to the total amount of low material monomer. When the amount is 2.5 mol % or less, the desired molecular weight distribution can not be obtained, therefore, an offset phenomena occurs at high temperature. In contrast, when the amount if 10 mol % or greater, the viscosity of prepared polyester resin is high, therefore, the fixing properties at low temperature becomes worse.

The active group ratio (COOH/OH) of the used monomer in the first reaction and in the second reaction is preferably in a range of 0.7 to 0.95. When the active group ratio is less than 0.7, the amount of hydroxyl group is large, therefore, the anti-moisture properties of the obtained resin worse.

As a result, the toners easily blocked together. In contrast, the active group ratio is more than 0.95, the remaining acid group is large, the controlling the polycondensation reaction becomes difficult.

By performing the second polycondensation reaction, even if poly monomers having more than 3 functional groups are used, the linear polyester resins of the present invention, which do not have a very large molecular weight, can be prepared in the first and second preparing method. Moreover, in order to obtain the linear polyester resin having a desired molecular weight distribution, it is preferable to add promptly and simultaneously the monomers used for the second polycondensation reaction.

As the diol component and dicarboxylic acid component used in the second polycondensation reaction, the diol component and dicarboxylic acid component used in the first polycondensation reaction can be used.

Moreover, as the polycarboxylic acid component having more than 3 carboxyl groups and polyol having more than 3 hydroxyl groups, the following compound can be given examples.

The polycarboxylic acid component having more than 3 carboxyl groups are, for example, trimellitic acid, 1,2,4-cyclohexane tricarboxylic acid, 1,2,4-naphtalene tricarboxylic acid, 2,5,7-naphtalene dicarboxylic acid, pyridine tricarboxylic acid, pyridine-2,3,4,6-t oxylic acid, 1,2,7,8-tetracarboxylic acid, butane tetraerboxylic acid, anhydrides thereof, low allyl esters thereof and the like.

The polyol having hydroxyl group of more than 3 are, for example, sorbitol, 1,2,3,6-hexanetetrol 1,4-sorbitan, pentaerythritol, dipentaerythritol, tripentaerythritol, 1,2,4-butane triol, 1,2,4,5-pentane triol, glycerol, diglycerol, 2-methylpropane triol, 2-methyl-1,2,4-butane triol, trimethyolethane, trimethylolpropane, 1,3,5-trihydroxy benzen and the like.

The preferred embodiments of toner comprised the polyester resin will be described below.

Besides the polyester resins, other resins, pigments, magnetic powders, charge controlling agents, properties improving agents such as fluidized agents, and the like can be used for the toner of the present invention.

The toner of the present invention can be obtained by adding pigments, magnetic powders, and charge controlling agents if need, to the binder resin; hang with a super mixer; melting and kneading them with a Danbury mixer, roll mill, needer, or extruder, rough pulverizing with a cutter mill, hammer mill or a like; fine pulverizing with a jet mill; classifying with a wind power classifier; and then mixing the classified toners with additives.

Representative examples of binder resins beside the above-mentioned polyester resins include, styrene resins, styrene-acrylic copolymer resin polyester resins, polyethylene resins, epoxy resins, silicon resins, polyamide resins, polyurethane resins, and the like.

Representative examples of said pigment include, carbon black, nigrosine, aniline blue, charcoal blue, chromium yellow, ultramarine blue, dupone oil red, quinine yellow, Methylene Blue Chloride, phtalocyanine blue, malachite green ocsalate, lamp black, Rose Bengal, mixture thereof, and the like. In order to form a sufficient visible image, it is necessary to include the pigments at a sufficient ratio. In general, the pigment is added at a ratio of 1–20 weight parts to 100 weight parts of the binder resin.

Representative examples of the magnetic powders include, metals having strong magnetic properties, such as ferrites, magnetite, iron, cobalt, nickel, alloys thereof, and the compounds comprised these elements; alloy which does not comprised strong magnetic elements but shows the strong magnetic properties when preferable heat treatment is performed, such as Hustler's alloy comprising Mn or Cu such as Mn-Cu-Al, Mn-Cu-Sn, chromium dioxide, and the like.

These magnetic powders are dispersed in the binder resin in a form of an average particle size of 0.1 to 1 micron. The adding amount of the magnetic powders are 20 to 70 weight parts to 100 parts of the binder resin, more preferable 40 to 70 weight parts.

Representative examples of the charge controlling agents include, nigrosine pigment, ammonium salt, azine, and the like. Moreover, when the charge controlling agent is added to the toner comprising polyester resin, for example, chromium complex, iron complex, and the like can be used as a charge controlling agent. In general, the adding amount of the charge controlling agents are 0.1 to 10 weight % to 100 parts of the binder resin.

The two-component developer can be obtained by mixing the toner prepared in the above-mentioned steps and carriers such as ferrite powders or iron powders. Moreover, one component developer can be obtained by adding the magnetic member to the toner.

In order to improve the low temperature fixing properties, it is preferable to set the melt starting temperature at 60 to 105° C. When the melt starting temperature is less than 60° C., the blocking properties of the toner become worse, and the storage properties thereof becomes worse. In contrast, when the melt starting temperature is more than 105° C., the low temperature fixing properties becomes worse. Moreover, in order to obtain a sufficiently offset temperature range, it is preferable that the melting viscosity at lower temperature below, and the temperature difference between the softening temperature and the melt starting temperature is in a range of 15 to 45° C. When the temperature difference is less than 15° C., the fixing offset temperature range (non-offset temperature range) is narrow. In contrast, when the temperature difference is more than 45° C., an anti-offset properties can be maintained, but the low temperature fixing properties becomes worse. In order to maintain the good low temperature fixing properties, it is most preferable to keep the melt stating temperature in a range of 60 to 100° C.

Under the following conditions, the melt starting temperature was designated to be the temperature at the time when the plunger's descent began. Similarly, the flow softening point was designated to be the temperature at the time when the plunger had traversed half the distance between the point where it began its descent and the bottom of the apparatus.

Initial melting temperatures and flow softening points were measured using a flow tester CFT-500C manufactured by SHIMAZU SEISAKUJYO, measuring conditions are as follows:

plunger: 1 cm$^2$ diameter of dye: 1 mm length of dye: 1mm load: 20 kgF preliminary heating temperature range: 50° C. to 80° C.

preliminary heating periods: 300 sec temperature increase speed of 6° C. /min.

EXPERIMENTAL EXAMPLES

The following are experimental examples based on the resin composition and the toner embodiments of the present invention presented above. In the Examples, "parts" mean "parts by weight".

EXAMPLE 1

316 g (1mol) of polyoxyethylene bisphenol A, 133 g (0.8 mol) of terephthalic acid, 0.005 g of di-butyltin oxide as a catalyst were put into a round bottom flask having four inlet portions provided with an agitator, a condenser, and an inlet for nitrogen gas. The linear polyester resin (1) of the present example was obtained by reacting the mixture while introducing a nitrogen gas from the inlet, heating the mixture at 200° C.; and after an outflow of water being completed, raising the temperature gradually to 230° C. for 1 hour; mixing for 2 hours maintaining this temperature; taking out the obtained melted polyester resin; and cooling at room temperature.

The Tg(°C.) of the obtained linear polyester resin (1) was 65° C., the melt starting temperature thereof was 87° C., the melting point thereof was 100° C., the peak top molecular weight was $6.1 \times 10^3$, the acid value was 10 KOH mg/g, and the hydroxyl group value was 50 KOH mg/g.

Next, 100 g of the obtained linear polyester resin (1) was put into a round bottom flask having four inlet portions provided with an agitator, a condenser, and an inlet for nitrogen gas. The polyester resin (A) was obtained by reacting the mixture while introducing a nitrogen gas from the inlet, heating and stirring it at 180° C. for 1 hour; simultaneously inputting 6.4 g of pentaerythritol, 0.6 g of 1,12-dodecan dicarboxylic acid, and 0.3 g of di-butyltin oxide as a catalyst; raising the temperature to 200° C , stirring the Ore while maintaining this temperature for 1 hour; and stopping the reaction when the stirring torque became four times the stirring torque immediately after adding the monomers.

EXAMPLE 2

100 g of the obtained linear polyester resin (1) in the Example 1 was put into a round bottom flask having four inlet portions provided with an agitator, a condenser, and an inlet for nitrogen gas. The polyester resin (B) was obtained by reacting the mixture while introducing a nitrogen gas from the inlet, heating and stirring it at 180° C. for 1 hour; 5.3 g of pentaeryhritol, 5.0 g of 1,12-dodecan dicarboxylic acid, and 0.3 g of di-butynyl oxide as a catalyst were simultaneously input; raising the temperature to 200° C., stirring the mixture while maintaining the temperature for 1 hour; and stopping the reaction when the sting torque became four times the stirring torque immediately after adding the monomers.

EXAMPLE 3

100 g of the obtained linear polyester resin (1) in the Example 1 was put into a round bottom flask having four inlet portions provided with an agitator, a condenser, and an inlet for nitrogen gas. The polyester resin (C) was obtained by reacting the mixture while introducing a nitrogen gas from the inlet, heating and stirring it at 180° C. for 1 hour; simultaneously inputting 4.2 g of pentaerythritol, 4.0 g of 1,12-dodecan dicarboxylic acid, and 0.3 g of di-butyltin oxide as a catalyst were simultaneously input; raising the temperature to 200° C., stirring the mixture with keeping the temperature for 1.5 hour; and stopping the reaction when the stirring torque became four times the stirring torque immediately after adding the monomers.

EXAMPLE 4

100 g of the obtained linear polyester resin (1) in the Example 1 was put into a round bottom flask having four inlet portions provided with an agitator, a condenser, and an inlet for nitrogen gas. The polyester resin (D) was obtained by reacting the while introducing a nitrogen gas from the inlet, heating and stirring it at 180° C. for 1 hour; simultaneously inputting 3.7 g of pentaerythritol, 3.5 g of 1,12-dodecan dicarboxylic acid, and 0.3 g of di-butyltin oxide as a catalyst; raising the temperature to 200° C., stirring the mire with keeping the temperature for 2 hour; and stopping the reaction when the stirring torque became four times the stirring torque immediately after adding the monomers.

Comparative Example 1

316 g (1 mol) of polyoxyethylene bisphenol A, 133 g (0.8 mol) of terephthelic acid, 5.8 g of butane tetracarboxylic acid, 10 g of polyethylene glycol (hydroxyl group value: 558 KOH mg/g; molecular weight: 200), and 0.5 g of butyltin oxide as a catalyst were put into a round bottom flask having four inlet portions provided with an agitator, a condenser, and an inlet for nitrogen gas. The polyester resin (K) of the present comparative example was obtained by reacting the mixture while introducing a nitrogen gas from the inlet, heating the mixture at 200° C.; and after an outflow of water being finished, raising the temperature gradually to 230° C. for 1 hour; mixing for 2 hours with keeping the temperature; taking out the obtained melted polyester resin; and cooling.

Comparative Example 2

100 g of the obtained linear polyester resin (1) in the Example 1 was put into a round bottom flask having four inlet portions provided with an agitator, a condenser, and an inlet for nitrogen gas. The polyester resin (L) was obtained by reacting the mixture while introducing a nitrogen gas from the inlet, heating and stirring it at 180° C. for 1 hour, 10.0 g of polyethylene glycol (hydroxyl group value: 558 KOH) mg/g; molecular weight: 200), stiring the mixture for 1 hour still the uniform mixture being obtained; adding 5.8 g of butane tetracarboxylic acid, and 0.3 g of butyltin oxide as a catalyst; raising the temperature to 200° C. ; stirring the mixture while maintaining the temperature for 1 hour; and stopping the reaction when the resin twined round the agitator.

Comparative Example 3

100 g of the obtained linear polyester resin (1) in the Example 1 was put into a round bottom flask having four inlet portions provided with an agitator, a condenser, and an inlet for nitrogen gas. The polyester resin (M) was obtained by reacting the mixture while introducing a nitrogen gas from the inlet, heating and stirring it at 180° C. for 1 hour; simultaneously inputting 3.7 g of pentaerythritol, 3.5 g of 1,12-dodecan dicarboxylic acid, and 0.3 g of di-butyltin oxide as a catalyst; raising the temperature to 200° C., stirring the mixture while maintaining the temperature for 2 hour; and stopping the reaction when the stirring torque became twice the stirring torque immediately after adding the monomers.

Comparative Example 4

The obtained linear polyester resin (1) in the Example 1 was used as the polyester resin in this comparative example.

EXAMPLE 5

344 g(1 mol) of polyoxyethylene bisphenol A(2,2'-bis[4-(2-hydroxyproplyleneoxy)phenyl]propane) 149.4 g (0.9 mol) of terephthalic acid, and 0.05 g of di-butyltin oxide as a catalyst were put into a round bottom flask having four inlet portions provided with a thermometer, an agitator with torque meter, a condenser, and an inlet for nitrogen gas; and heating and stirring the mixture while introducing a nitrogen gas from the inlet at 200° C. After draining water, the linear polyester resin (2) was prepared by rising the reaction temperature at 230° C. for 1 hour, and stirring the mixture for 2 hours.

The Tg (° C. ) of the obtained linear polyester resin (2) was 65° C., the melt starting temperature thereof was 85° C., the melting point thereof was 98° C., the peak top molecular weight was $4.2 \times 10^3$, the acid value was 17 KOH mg/g, and the hydroxyl group value was 48 KOH mg/g.

After cooling the reaction temperature to from 230° C. to 200° C. for 1 hour, the polyester resin (E) of this Example was prepared by inputting 13.6 g (0.1 mol) of pentaethrtol, 20.5 g (0.06 mol) of eicosanoic diacid, and 0.6 g of di-butylin oxide as a catalyst; maintaining the temperature for 1 hour; rising the temperature at 220° C.; stirring them for 2 hours; after draining water decreasing the pressure in the reaction vessel to 5 Torr stopping the reaction when the stirring torque became 4 times the stirring torque immediately after adding the monomers.

EXAMPLE 6

344 g(1 mol) of polyoxyethylene bisphenol A, 149.4 g (0.9 mol) of isophthalic acid, and 0.05 g of di-butyltin oxide as a catalyst were put into a round bottom flask having four inlet portions provided with a thermometer, an agitator with torque meter, a condenser, and an inlet for nitrogen gas; and the linear polyester resin (3) of this Example was prepared in the same process as in Example 5.

The Tg (° C.) of the obtained linear polyester resin (3) was 63° C., the melt staring temperature thereof was 83° C., the melting point thereof was 96° C., the peak top molecular weight was $4.1 \times 10^3$, the acid value was 20 KOH mg/g, and the hydroxyl group value was 50 KOH mg/g.

After cooling the reaction temperature to from 230° C. to 200° C. for 1 hour, the polyester resin (F) of this Example was prepared by inputting 24.15 g (0.18 mol of trimethyol propane, 18.4 g (0.08 mol) of dodecanic diacid, and 0.6 g of di-butyltin oxide as a catalyst and treating the mixture in the same process as in Example 5; and stopping the reaction when the stirring torque became 4 times the stirring torque immediately after adding the monomers.

13

EXAMPLE 7

344 g(1 mol) of polyoxyethylene bisphenol A, 132.8 g (0.8 mol) of terephthalic acid, and 0.05 g of di-butyltin oxide as a catalyst were put into a round bottom flask having four inlet portions provided with a thermometer, an agitator with torque meter, a condenser, and an inlet for nitrogen gas; and the linear polyester resin of this Example (4) was prepared in the same process as in Example 5.

The Tg (° C.) of the obtained linear polyester resin (4) was 67° C., the melt starting temperature thereof was 89° C., the melting point thereof was 104° C., the peak top molecular weight was $5.0 \times 10^3$, the acid value was 10 KOH mg/g, and the hydroxyl group value was 50 KOH mg/g.

After cooling the reaction temperature to from 230° C. to 200° C. for 1 hour, the polyester resin (G) of this Example was prepared by inputting 20.2 g (0.1 mol) of 1,2-dodecane diol, 18.7 g (0.08 mol) of butane tetracarboxylic acid, and 0.5 g of di-butyltin oxide as a catalyst and treating the mixture in the same process as in Example 5; and stopping the reaction when the stirring torque became 4 times the stirring torque immediately after adding the monomers.

EXAMPLE 8

344 g(1 mol) of polyoxyethylene bisphenol A, 141.2 g (0.85 mol) of isophthalic acid, and 0.05 g of di-butyltin oxide as a catalyst were put into a round bottom flask having four inlet portions provided with a thermometer, an agitator with torque meter, a condenser, and an inlet for nitrogen gas; and the linear polyester resin of this Example (5) was prepared in the same process as in Example 5.

The Tg (° C.) of the obtained linear polyester resin (5) was 62° C., the melt starting temperature thereof was 82° C., the melting point thereof was 95° C., the peak top molecular weight was $4.0 \times 10^3$, the acid value was 14 KOH mg/g, and the hydroxyl group value was 64 KOH mg/g.

After cooling the reaction temperature to from 230° C. to 200° C. for 1 hour, the polyester resin (H) of this Example was prepared by inputting 13.4 g (0.1 mol) of trimethyol propane, 11.7 g (0.05 mol) of butane tetracarboxylic acid, 10.1 g (0.05 mol) of 1,2-dodecane diol, and 0.3 g of di-butyltin oxide as a catalyst and treating the mire in the same process as in Example 5; and stopping the reaction when the sting torque became 4 times the stirring torque immediately after adding the monomers.

EXAMPLE 9

The linear polyester resin (2) was prepared in the same process as in Example 5.

After cooling the reaction temperature to from 230° C. to 200° C. for 1 hour, the polyester resin (J) of this Example was prepared by inputting 21.0 g (0.1 mol) of trimellitic acid, 6.8 g (0.05 mol) of pentaerythritol, 12.9 g (0.05 mol) of 1,2-dodecane dioarboxylic acid, and 0.3 g of di-butyltin oxide as a catalyst and maintaining the temperature for 1 hour; rising the temperature at 220° C.; stirring them for 2 hours; after draining water decreasing the pressure in the reaction vessel to 5 Torr stopping the reaction when the stirring torque became 4 times the stiring torque immediately after adding the monomers.

Comparative Example 5

The linear polyester resin (3) was prepared in the same process as in Example 6.

After cooling the reaction temperature to from 230° C. to 200° C. for 1 hour, the polyester resin (N) of this Example was prepared by inputting 6.7 g (0.05 mol) of trimethyol

14 propane, 23.0 g (0.1 mol) of dodecane dicarboxylic acid, and 0.6 g of di-butyltin oxide as a catalyst maintaining the temperature for 1 hour; rising the temperature at 220° C. ; stirring them for 2 hours; after draining water decreasing the pressure in the reaction vessel to 5 Torr stopping the reaction when the stirring torque became 1.5 times the stiring torque immediately after adding the monomers.

Comparative Example 6

344 g (1 mol) of polyoxyethylene bisphenol A, 141.2 g (0.85 mol) of terephthalic acid, and 0.05 g of di-butyltin oxide as a catalyst were put into a round bottom flask having four inlet portions provided with a thermometer, an agitator with torque meter, a condenser, and an inlet for nitrogen gas; and the linear polyester resin of this Example (6) was prepared in the same process as in Example 5.

The Tg (° C.) of the obtained linear polyester resin (6) was 66° C., the melt starting temperature thereof was 87° C., the melting point thereof was 102° C., the peak top molecular weight was $4.0 \times 10^3$, the acid value was 14 KOH mg/g, and the hydroxyl group value was 64 KOH mg/g.

After cooling the reaction temperature to from 230° C. to 200° C. for 1 hour, the polyester resin (O) of this Example was prepared by inputting 27.2 g (0.2 mol) of pentaerythritol, 23.4 g (0.1 mol) of butane tetracarboxylic acid, 34.2 g (0.1 mol) of eicosanoic dicarboxylic acid, and 0.6 g of di-butyltin oxide as a catalyst and treating the mixture in the same process as in Example 5; and stopping the reaction when the resin twined round the agitator.

Comparative Example 7

344 g (1 mol) of polyoxyethylene bisphenol A, 124.6 g (0.75 mol) of terephthalic acid, and 0.05 g of di-butyltin oxide as a catalyst were put into a round bottom flask having four inlet portions provided with a thermometer, an agitator with torque meter, a condenser, and an inlet for nitrogen gas; and the linear polyester resin of this Example (7) was prepared in the same process as in Example 5.

The Tg (° C.) of the obtained linear polyester resin (7) was 60° C., the melt starting temperature thereof was 80° C., the melting point thereof was 92° C., the peak top molecular weight was $4.8 \times 10^3$, the acid value was 8 KOH mg/g, and the hydroxyl group value was 57 KOH mg/g.

After cooling the reaction temperature to from 230° C. to 200° C. for 1 hour, the polyester resin (P) of this Example was prepared by inputting 20.4 g (0.15 mol) of pentaerythritol, 20.5 g (0.06 mol) of eicosanoic dicarboxylic acid, and 0.6 g of di-butyltin oxide as a catalyst and treating the mixture in the same process as in Example 5; and stopping the reaction when the resin twined round the agitator.

Comparative Example 8

344 g (1 mol) of polyoxyethylene bisphenol A, 166.1 g (1.0 mol) of isophthalic acid, and 0.05 g of di-butyltin oxide as a catalyst were put into a round bottom flask having four inlet portions provided with a thermometer, an agitator with torque meter, a condenser, and an inlet for nitrogen gas; and the linear polyester resin of this Example (8) was prepared in the same process as in Example 5.

The Tg (° C.) of the obtained linear polyester resin (8) was 64° C., the melt starting temperature thereof was 86° C., the melting point thereof was 106° C., the peak top molecular weight was $4.1 \times 10^3$, the acid value was 25 KOH mg/g, and the hydroxyl group value was 47 KOH mg/g.

After cooling the reaction temperature to from 230° C. to 200° C. for 1 hour, the polyester resin (Q) of this Example was prepared by inputting 26.8 g (0.2 mol) of trimethyol propane, 64.5 g (0.25 mol) of 1,12-dodecane dicarboxylic acid, and 0.6 g of di-butyltin oxide as a catalyst and treating the mixture in the same process as in Example 5; and stopping the reaction when the resin twined round the agitator.

Comparative Example 9

The monomers used in Example 5, that is, 344 g(1 mol) of polyoxyethylene bisphenol A, 149.4 g (0.9 mol) of terephthalic acid, and 0.65 g of di-butyltin oxide, 13.6 g (0.1 mol) of pentaerythritol, and 20.5 g (0.06 mol) of eicosanoic diacid were put into a round bottom flask having four inlet portions provided with a thermometer, an agitator with torque meter, a condenser, and an inlet for nitrogen gas; and heating and string the mixture while introducing a nitrogen gas from the inlet at 200° C. for 1 hour. The polyester resin (R) of this Comparative Example was prepared by rising the reaction temperature at 220° C., stirring it with maintaining the temperature for 2 hour, after draining water decreasing the pressure in the reaction vessel to 5 Torr stopping the reaction when the stirring torque became 4 times the stirring torque immediately after adding the monomers.

The weight of the insoluble component in THF, and the soluble component in THF of the polyester resins prepared in examples, and comparative examples. The results are shown in Tables 1 to 4. The polyester resins prepared in Examples 1 to 4 and Comparative Examples 1 to 4, and other component were mixed with a Super Mixer at a following composition. After melting and kneading the mixture, the particles having an average particle diameter of 11:m were obtained by classifying. The negatively charged toner particles were prepared by staining 0.3 parts of hydrophobic $SiO_2$ ("R-972" produced by AEROSIL Co., Ltd.) to the surface of the obtained classified particles, using a Herschel Mixer.

polyester resins 97 parts carbon black 6.5 parts (MA-100, produced by MITSUBISHI CHEMICAL INDUSTRIES Co., Ltd.)

metallic dye containing chromium 2 parts ("Bontron S-34", produced by ORIENT CHEMICAL INDUSTRIES Co., Ltd.)

polypropylene 3 parts ("Viscol 330P", produced by SANYOKASEI INDUSTRIES Co., Ltd)

Next, the toners were prepared by using each polyester resins prepared in Examples 5 to 9 and Comparative Examples 5 to 9 in the same process as in Examples 1 to 4, on condition that the metallic dye containing chromium ("Bontron S-34", produced by ORIENT CHEMICAL INDUSTRIES Co., Ltd.) was substituted to dye ("TRH", produced by HODOGAYA CHEMICAL INDUSTRIAL Co., Ltd.).

The following evaluation tests were performed on the obtained toners.

(1) Non Offset Temperature Range, and Non Offset-Temperature Width Two component developers were obtained, which is comprised of 4 parts of the obtained toners in Examples and Comparative Examples and 96 parts of non-coated Ferrite carrier (trade name: FL-1020, marketed by Powder Teck Co.). The obtained developers were used to produce stripe test patterns of 20 mm×50 mm size on A4 size printing paper using a copying machine (Examples 1 to 4, and Comparative Examples 1 to 4: trade name: SF-9800, marketed by SHARP Co.; Examples 5 to 9, and Comparative Examples 5 to 9: trade name: Z-133, marketed by SANYO ELECTRIC Co. Ltd.).

Next, a fixing device having a thermal fixing roll whose surface is covered with fluorine-contained resin, and a press fixing roll whose surface is covered with silicone were used to fix the above unfixed test patterns. The fixing conditions were: pressure of the press fixing roll at 10 $g/mm^2$, roll speed at 200 mm/sec. The temperature of the surface of the thermal fixing roll was made to rise gradually. A temperature range that no toner smudging was observed in a white margin of the printing sheet was defined as an Non Offset-Temperature Range. A difference of temperature between the lowest temperature and the highest temperature in the Non Offset-Temperature Range was defined as an Non Offset-Temperature Width.

(2) Fixing Strength

The unfixed test patterns were fixed by using the thermal King roll whose temperature of surface being 130° C. The image densities of the fixed test patterns were measured, after rubbing them with cotton pads under a constant rubbing pressure. The image densities were measured by an illuminator (trade name: RD-914, marketed by Macbeth). The Hag strength, in %, was determined according to the following mathematical expression, (After-rubbing strength/as-fixed strength) ×100

The results of evaluation testing are in Tables 1 to 4.

TABLE 1

| | Example | | | |
|---|---|---|---|---|
| | 1 | 2 | 3 | 4 |
| Used linear polyester resin | (1) | (1) | (1) | (1) |
| Used polyester resins of the present invention | A | B | C | D |
| Resin | | | | |
| Weight % of the component dissolved in THF to the obtained resin | 4.5 | 1.0 | 0 | 0 |
| The component solved in THF | | | | |
| Weight % of polymer having molecular weight of $1 \times 10^6$ or more | 2.6 | 7.5 | 2.5 | 2.9 |
| Weight % of polymer having molecular weight of $1 \times 10^5$ or more | 18.6 | 15.0 | 15.5 | 12.1 |
| Weight % of polymer having molecular weight of $1 \times 10^4$ or less (W1) | 46.2 | 49.0 | 52.0 | 58.1 |
| Weight % of polymer having molecular weight of $1 \times 10^4$ to $1 \times 10^5$ (W2) | 35.2 | 36.0 | 32.5 | 29.8 |
| W1/W2 | 1.31 | 1.36 | 1.60 | 1.95 |
| Peak top molecular weight ($\times 10^3$) | 6.6 | 6.6 | 6.5 | 7.6 |
| Acid value (KOH mg/g) | 1.2 | 1.8 | 2.5 | 3.8 |
| hydroxyl group value (KOH mg/g) | 58 | 55 | 50 | 48 |
| The ratio of polycarboxylic acid component having more than 3 carboxyl groups to the total monomers | — | — | — | — |
| The ratio of polyol component having more than 3 hydroxyl groups to the total monomers | 9.50 | 8.00 | 6.78 | 5.75 |
| The ratio of activated group to the total monomer (COOH/OH) | 0.64 | 0.66 | 0.69 | 0.70 |

TABLE 1-continued

|  | Example | | | |
|---|---|---|---|---|
|  | 1 | 2 | 3 | 4 |
| Toner | | | | |
| Glass transition temperature (° C.) | 58 | 60 | 62 | 64 |
| Melt starting temperature (° C.) | 99 | 95 | 92 | 90 |
| Softening temperature (° C.) | 135 | 128 | 123 | 118 |
| Temperature width between softening temperature and melt starting temperature (° C.) | 36 | 33 | 31 | 28 |
| Fixing strength (%) | 81 | 94 | 98 | 99 |
| Non-offset temperature range (° C.) | 110~230 | 110~220 | 105~215 | 100~200 |
| Non-offset temperature width (° C.) | 120 | 110 | 110 | 100 |

TABLE 2

|  | Example | | | | |
|---|---|---|---|---|---|
|  | 5 | 6 | 7 | 8 | 9 |
| Used linear polyester resin | (2) | (3) | (4) | (5) | (2) |
| Used polyester resins of the present invention | E | F | G | H | J |
| Resin | | | | | |
| Weight % of the component dissolved in THF to the obtained resin | 0.8 | 4.5 | 1.5 | 3.8 | 2.3 |
| The component solved in THF | | | | | |
| Weight % of polymer having molecular weight of 1 × 10⁶ or more | 3.8 | 6.7 | 5.8 | 8.6 | 5.4 |
| Weight % of polymer having molecular weight of 1 × 10⁵ or more | 11.6 | 18.8 | 10.5 | 15.6 | 19.3 |
| Weight % of polymer having molecular weight of 1 × 10⁴ or less (W1) | 60.3 | 48.2 | 62.3 | 52.3 | 46.1 |
| Weight % of polymer having molecular weight of 1 × 10⁴ to 1 × 10⁵ (W2) | 28.1 | 33.0 | 27.2 | 32.1 | 34.6 |
| W1/W2 | 2.14 | 1.46 | 2.29 | 1.63 | 1.33 |
| Peak top molecular weight (×10³) | 4.5 | 3.8 | 5.2 | 4.0 | 6.3 |
| Acid value (KOH mg/g) | 3.5 | 2.3 | 4.2 | 2.8 | 4.8 |
| hydroxyl group value (KOH mg/g) | 40 | 45 | 38 | 42 | 55 |
| The ratio of polycarboxylic acid component having more than 3 carboxyl groups to the total monomers | — | — | 4.04 | 2.44 | 3.57 |
| The ratio of polyol component having more than 3 hydroxyl groups to the total monomers | 4.85 | 8.33 | — | 4.88 | 3.57 |
| The ratio of activated group to the total monomer (COOH/OH) | 0.80 | 0.77 | 0.87 | 0.79 | 1.00 |
| Toner | | | | | |
| Glass transition temperature (° C.) | 61 | 60 | 63 | 62 | 65 |
| Melt starting temperature (° C.) | 98 | 102 | 99 | 100 | 104 |
| Softening temperature (° C.) | 125 | 132 | 128 | 130 | 135 |

TABLE 2-continued

|  | Example | | | | |
|---|---|---|---|---|---|
|  | 5 | 6 | 7 | 8 | 9 |
| Temperature width between softening temperature and melt starting temperature (° C.) | 27 | 30 | 29 | 30 | 31 |
| Fixing strength (%) | 92 | 90 | 88 | 86 | 82 |
| Non-offset temperature range (° C.) | 105~215 | 110~225 | 110~220 | 110~225 | 115~220 |
| Non-offset temperature width (° C.) | 110 | 115 | 110 | 115 | 105 |

TABLE 3

|  | Comparative Example | | | |
|---|---|---|---|---|
|  | 1 | 2 | 3 | 4 |
| Used linear polyester resin | — | (1) | (1) | (1) |
| Used polyester resins of the present invention | K | L | M | — |
| Resin | | | | |
| Weight % of the component dissolved in THF to the obtained resin | 21.7 | 8.3 | 0 | 0 |
| The component solved in THF | | | | |
| Weight % of polymer having molecular weight of 1 × 10⁶ or more | 4.6 | 2.6 | 0 | 0 |
| Weight % of polymer having molecular weight of 1 × 10⁵ or more | 15.3 | 16.0 | 6.8 | 0 |
| Weight % of polymer having molecular weight of 1 × 10⁴ or less (W1) | 44.4 | 46.5 | 65.3 | 85.5 |
| Weight % of polymer having molecular weight of 1 × 10⁴ to 1 × 10⁵ (W2) | 40.3 | 37.5 | 27.9 | 14.5 |
| W1/W2 | 1.10 | 1.24 | 2.34 | 5.89 |
| Peak top molecular weight (×10³) | 11.2 | 10.5 | 7.2 | 6.1 |
| Acid value (KOH mg/g) | 1.8 | 3.8 | 6.2 | 10 |
| hydroxyl group value (KOH mg/g) | 20 | 43 | 78 | 110 |
| The ratio of polycarboxylic acid component having more than 3 carboxyl groups to the total monomers | 1.37 | 4.96 | — | — |
| The ratio of polyol component having more than 3 hydroxyl groups to the total monomers | — | — | 5.78 | — |
| The ratio of activated group to the total monomer (COOH/OH) | 0.81 | 0.83 | 0.70 | 0.80 |
| Toner | | | | |
| Glass transition temperature (° C.) | 59 | 58 | 59 | 68 |
| Melt starting temperature (° C.) | 106 | 103 | 91 | 88 |
| Softening temperature (° C.) | 149 | 139 | 105 | 102 |
| Temperature width between softening temperature and melt starting temperature (° C.) | 43 | 36 | 14 | 14 |
| Fixing strength (%) | 45 | 59 | 99 | — |
| Non-offset temperature range (° C.) | 130~230 | 120~230 | 100~145 | * |
| Non-offset temperature width (° C.) | 100 | 110 | 45 | no width |

In Table 3, * indicates an offset phenomena occurs in all temperature range.

TABLE 4

|  | Comparative Example | | | | |
| --- | --- | --- | --- | --- | --- |
|  | 5 | 6 | 7 | 8 | 9 |
| Used linear polyester resin | (3) | (6) | (7) | (8) | — |
| Used polyester resins of the present invention | N | O | P | Q | R |
| Resin | | | | | |
| Weight % of the component dissolved in THF to the obtained resin | 0 | 10.8 | 8.5 | 7.5 | 5.8 |
| The component solved in THF | | | | | |
| Weight % of polymer having molecular weight of $1 \times 10^6$ or more | 0 | 11.2 | 10.5 | 4.6 | 8.5 |
| Weight % of polymer having molecular weight of $1 \times 10^5$ or more | 4.8 | 25.5 | 22.3 | 12.2 | 22.4 |
| Weight % of polymer having molecular weight of $1 \times 10^4$ or less (W1) | 74.9 | 35.6 | 40.5 | 48.6 | 32.5 |
| Weight % of polymer having molecular weight of $1 \times 10^4$ to $1 \times 10^5$ (W2) | 21.3 | 39.9 | 37.2 | 39.2 | 45.1 |
| W1/W2 | 3.51 | 0.89 | 1.09 | 1.23 | 0.72 |
| Peak top molecular weight ($\times 10^3$) | 4.3 | 8.5 | 14.5 | 5.9 | 12.5 |
| Acid value (KOH mg/g) | 4.6 | 7.5 | 6.1 | 10.3 | 3.7 |
| hydroxyl group value (KOH mg/g) | 15 | 120 | 80 | 48 | 35 |
| The ratio of polycarboxylic acid component having more than 3 carboxyl groups to the total monomers | — | 1.65 | — | — | — |
| The ratio of polyol component having more than 3 hydroxyl groups to the total monomers | 2.44 | 3.31 | 7.65 | 8.16 | 4.85 |
| The ratio of activated group to the total monomer (COOH/OH) | 0.93 | 0.82 | 0.62 | 0.96 | 0.80 |
| Toner | | | | | |
| Glass transition temperature (° C.) | 60 | 68 | 59 | 67 | 60 |
| Melt starting temperature (° C.) | 90 | 112 | 106 | 108 | 109 |
| Softening temperature (° C.) | 104 | 150 | 145 | 148 | 141 |
| Temperature width between softening temperature and melt starting temperature (° C.) | 14 | 38 | 39 | 40 | 32 |
| Fixing strength (%) | — | 48 | 52 | 54 | 59 |
| Non-offset temperature range (° C.) | * | 140 ~ 230 | 135 ~ 230 | 130 ~ 230 | 120 ~ 230 |
| Non-offset temperature width (° C.) | no width | 90 | 95 | 100 | 110 |

In Table 3, * indicates an offset phenomena occurs in all temperature range

It is clear from Tables 1 to 4 that the toners of Examples have the lowest fixing temperature of Non-offset temperature range of 115° C. or less, and the Non-offset temperature width thereof were 100° C. or greater. These results are sufficient for practical use. Moreover, the fixing strength is 80% or greater even when the temperature of the heat fixing roller is 130° C.

In contrast, the lowest fixing temperature of Non-offset temperature range of the toners prepared in Comparative Examples 1,2, and 6 to 9 are 120° C. or greater, which is greater than the lowest fixing temperature of the toners prepared in Examples. The fixing strengths are also 59% or less, which is lower than the fixing strengths of the toners prepared in Examples.

Moreover, the Non-offset temperature width of the toner prepared in Comparative Example 3 is 45° C., which is extremely narrower than the Non-offset temperature range of the toners prepared Examples. In the toner prepared in Comparative Examples 4 and 5, the Non-offset temperature range cold be obtained, low temperature offset phenomena occurred at the fixing temperature of 130° C., a fixing could not entirely performed.

What is claimed is:

1. A polyester resin having the following properties:
   (1) a polyester obtained by putting 0.5 g of the resin into 50 ml of THF, dissolving at 60° C. for three hours, and filtering said polyester with a filter, is 5 wt.% or less of said 0.5 g of the resin;
   (2) of the polyester soluble in THF, the amount of polyester having a molecular weight of $1 \times 10^6$ or greater is present in an amount of 1 to 10 wt.%;
   (3) of the polyester soluble in THF, the amount of polyester having a molecular weight of $1 \times 10^5$ or greater is present in an amount of 10 to 20 wt.%; and
   (4) W1 is >W2, wherein W1 is the amount of soluble polyester having a molecular weight less than $1 \times 10^4$, and W2 is the amount of soluble polyester having a molecular weight greater than $1 \times 10^4$ and less than $1 \times 10^5$.

2. The polyester resin as claimed in claim 1, wherein peak top molecular weight of the polyester soluble in THF is in a range of $1 \times 10^3$ to $1 \times 10^4$, and the acid value of the polyester soluble in THF equals 5 KOH mg/g or less.

3. The polyester resin as claimed in claim 1, wherein the W1/W2 is in the range of 1.3 to 3.5.

4. The polyester resin as claimed in claim 2, wherein the polyester soluble in THF comprises a polycarboxylic acid component having more than 3 carboxyl groups, and the ratio of polycarboxylic acid component to the total monomers is in the range of 2.5 mol% to 10 mol%, and the ratio of COOH/OH of the total monomer is in the range of 0.7 to 0.95.

5. The polyester resin as claimed in claim 2, wherein the polyester soluble in THF comprises a polyol component having more than 3 hydroxyl groups, and the ratio of polyol component to the total monomers is in the range of 2.5 mol% to 10 mol%, and the ratio of COOH/OH of the total monomer is in the range of 0.7 to 0 95.

6. A process for preparing a polyester resin having the following properties:
   (1) a polyester obtained by putting 0.5 g of the resin into 50 ml of THF, dissolving at 60° C. for three hours, and filtering said polyester with a filter, is 5 wt.% or less of said 0.5 g of the resin;
   (2) of the polyester soluble in THF, the amount of polyester having a molecular weight of $1 \times 10^6$ or greater is present in an amount of 1 to 10 wt.%;
   (3) of the polyester soluble in THF, the amount of polyester having a molecular weight of $1 \times 10^5$ or greater is present in an amount of 10 to 20 wt.%; and
   (4) W1 is >W2, wherein W1 is the amount of soluble polyester having a molecular weight less than $1 \times 10^4$, and W2 is the amount of soluble polyester having a molecular weight greater than $1 \times 10^4$, and less than $1 \times 10^5$, comprising the steps of melting with heat a linear polyester resin having a molecular weight peak top in a range of $1 \times 10^3$ to $1 \times 10^4$, and the total amount of an acid value and hydroxyl group value being equal to 100 KOH mg/g or less; and polycondensating with at least one component selected from the group consisting of polycarboxylic acid component having more than 3 carboxyl groups and polyol having more than 3 hydroxyl groups, and at least one component selected from the group consisting of diol component and dicarboxylic acid component.

7. A process for preparing a polyester resin having the following properties:

(1) a polyester obtained by putting 0.5 g of the resin into 50 ml of THF, dissolving at 60° C. for three hours, and filtering said polyester with a filter, is 5 wt.% or less of said 0.5 g of the resin;

(2) of the polyester soluble in THF, the amount of polyester having a molecular weight of $1 \times 10^6$ or greater is present in an amount of 1 to 10 wt.%;

(3) of the polyester soluble in THF, the amount of polyester having a molecular weight of $1 \times 10^5$ or greater is present in an amount of 10 to 20 wt.%; and (4) W1 is >W2, wherein W1 is the amount of soluble polyester having a molecular weight less than $1 \times 10^4$, and W2 is the amount of soluble polyester having a molecular weight greater than $1 \times 10^4$ and less than $1 \times 10^5$, comprising the steps of synthesizing a linear polyester resin having a molecular weight peak top in a range of $1 \times 10^3$ to $1 \times 10^4$, and the total amount of an acid value and hydroxyl group value being equal to 100 KOH mg/g or less; and polycondensating the prepared linear polyester resin with at least one component selected from the group consisting of polycarboxylic acid component having more than 3 carboxyl groups and polyol having more than 3 hydroxyl groups, and at least one component selected from the group consisting of diol component and dicarboxylic acid component; and;

stopping the polycondensation reaction when the stirring torque becomes 2 to 5 times the stirring torque immediately after adding the at least one component selected from the group consisting of polycarboxylic acid component having more than 3 carboxyl groups and polyol having more than 3 hydroxyl groups, and at least one component selected from the group consisting of diol component and dicarboxylic acid component.

8. The process for preparing a polyester resin as claimed in claim 7, wherein the amount of the at least one component selected from the group consisting of polycarboxylic acid component having more than 3 carboxyl groups and polyol having more than 3 hydroxyl groups is in a range of 2.5 mol % to 10 mol % to the total monomers.

9. A toner comprising a polyester resin having the following properties:

(1) a polyester obtained by putting 0.5 g of the resin into 50 ml of THF, dissolving at 60° C. for three hours, and filtering said polyester with a filter, is 5 wt.% or less of said 0.5 g of the resin;

(2) of the polyester soluble in THF, the amount of polyester having a molecular weight of $1 \times 10^6$ or greater is present in an amount of 1 to 10 wt.%;

(3) of the polyester soluble in THF, the amount of polyester having a molecular weight of $1 \times 10^5$ or greater is present in an amount of 10 to 20 wt.%; and (4) W1 is >W2, wherein W1 is the amount of soluble polyester having a molecular weight less than $1 \times 10^4$, and W2 is the amount of soluble polyester having a molecular weight greater than $1 \times 10^4$ and less than $1 \times 10^5$.

10. The toner as claimed in claim 9, wherein W1/W2 is in a range of 1.3 to 3.5.

11. The toner as claimed in claim 9, and having a melt starting temperature in a range of 60 to 105° C.

12. The toner as claimed in claim 9, and having a temperature difference between a softening temperature and a melt starting temperature in a range of 15 to 45° C.

13. The toner as claimed in claim 9, wherein peak top molecular weight of the polyester soluble in THF is in a range of $1 \times 10^3$ to $1 \times 10^4$, and the acid value of the polyester soluble in THF equals 5 KOH mg/g or less.

14. The toner as claimed in claim 13, wherein the polyester soluble in THF comprises a polycarboxylic acid component having more than 3 carboxyl groups, and the ratio of polycarboxylic acid component to the total monomers is in the range of 2.5 mol% to 10 mol%, and the ratio of COOH/OH of the total monomer is in the range of 0.7 to 0.95.

15. The toner as claimed in claim 13, wherein the polyester soluble in THF comprises a polyol component having more than 3 hydroxyl groups, and the ratio of polyol component to the total monomers is in the range of 2.5 mol% to 10 mol%, and the ratio of COOH/OH of the total monomer is in the range of 0.7 to 0.95.

* * * * *